United States Patent [19]

Gemignani

[11] Patent Number: 4,872,639
[45] Date of Patent: Oct. 10, 1989

[54] PILOT-CONTROL SAFETY VALVE

[75] Inventor: Andre Gemignani, Saint Mitre Les Rempapts, France

[73] Assignee: Societe d'Exploitation de Brevets Pour l'Industrie et la Marine Sebim, Chateauneuf, France

[21] Appl. No.: 234,967

[22] Filed: Aug. 19, 1988

[30] Foreign Application Priority Data

Aug. 25, 1987 [FR] France ............................. 87 12172

[51] Int. Cl.⁴ .......................................... F16K 31/126
[52] U.S. Cl. ................................. 251/61.4; 251/61.5; 251/335.3
[58] Field of Search ..................... 251/61.2, 61.3, 61.4, 251/61.5, 63.5, 63.6, 335.3

[56] References Cited

U.S. PATENT DOCUMENTS

| | | |
|---|---|---|
| 2,654,394 | 10/1953 | Thorburn ........................... 251/61.4 |
| 2,770,251 | 11/1956 | Goddard et al. ................... 251/61.3 |
| 2,807,421 | 9/1957 | Carlson, Jr. ........................ 251/360 |
| 2,885,173 | 5/1959 | Dobrick ............................. 251/61.3 |
| 3,084,901 | 4/1963 | Thorburn .......................... 251/61.4 |
| 3,322,142 | 5/1967 | Baumann ........................... 251/61.4 |
| 4,214,727 | 7/1980 | Baram ............................... 251/63.6 |
| 4,431,159 | 2/1984 | Stubbs .............................. 251/63.6 |
| 4,515,344 | 5/1985 | Gemignani ........................ 251/63.5 |
| 4,526,341 | 7/1985 | Thomas ........................... 251/335.3 |
| 4,553,564 | 11/1985 | Baram ............................... 251/63.5 |

Primary Examiner—George L. Walton
Attorney, Agent, or Firm—Herbert Dubno

[57] ABSTRACT

A piloted-safety valve in which a shaft is guided in a guide sleeve in the valve body and both the shaft and the guide sleeve have collars to which ends of an extensible metal jacket are sealingly anchored. The jacket, e.g. a bellows, is in a compressed state when the valve is closed.

15 Claims, 3 Drawing Sheets

PILOT-CONTROL SAFETY VALVE

CROSS REFERENCE TO RELATED APPLICATION

This application is related to the commonly-owned copending application Ser. No. 07/025,382 filed Mar. 13, 1987.

Reference may be had to one or more of the following commonly-owned U.S. patents as well:

| | |
|---|---|
| 4,200,116 | 4,291,721 |
| 4,515,344 | 4,522,369. |

FIELD OF THE INVENTION

My present invention relates to a pilot-controlled safety valve.

BACKGROUND OF THE INVENTION

It is imperative to equip boilers and other circuits or systems containing a fluid under pressure with a safety valve designed to vent the pressure in a protected space to the atmosphere. In some cases a pressure relief valve in which the pressure within the space works only against a spring on the valve member, can be effective. In more sophisticated applications, however, such as in boilers for power plants, ships and industrial plants, or for the pressurized vessels of nuclear installations, it is desirable to provide a pilot-controlled valve in which the opening of the valve is ensured by the control of a pilot pressure which is applied to the valve member. A pilot valve can control the pilot pressure and the system may be operated in a master-slave relationship in which the valve provided at the pressure space is slaved to the pilot valve which can sense the pressure in this space.

The safety valve thus has the function of protecting a space under pressure and the equipment associated with that space when the pressure of the fluid in the space reaches a maximum predetermined pressure, thereby avoiding overpressures which may be a nuisance or dangerous should they arise in the protected space.

In general the safety valve is mounted on the space to be protected, e.g. on the boiler or other pressure vessel while the pilot system can be located away from the protected space, is connected to the protected space by a sensing conduit so as to be capable of responding to the pressure in the space, and is provided with means, namely the pilot valve, providing a fluid feed to the head of the safety valve to contribute a countervailing force to the forces of the fluid in the protected space. The safety valve comprises a valve body mounted on the pressure vessel and formed with a passage whose upper end constitutes a seat cooperating with a valve closure member. An orifice is also provided in the valve body to permit communication of the interior of the valve body to the atmosphere in an open position of the valve.

The valve member is mounted at one end of a rod sliding in the interior of the body and at the other end of which a command piston is provided in a cylinder fed with fluid from the pilot pressure source.

While such vales were found to be a major advance by comparison to the safety valves which had been used earlier, they have been found to have a number of drawbacks.

Firstly, the safety valve is of relatively complex construction because of the need for a command piston and cylinder. The sensitivity of such a cylinder made it necessary to provide thermal barriers to prevent the temperature within the vessel from adversely affecting the operation of the cylinder and the piston. Special attention had to be paid to the seals between the cylinder and the protected space or the atmosphere and which was susceptible to frictional wear and thus were compelled to offer a resistance to movement of the rod and the valve member and which were under considerable pressure and stress in the normally closed position of the valve when it was most necessary to avoid any significant contribution to resistance of displacement of the piston and the valve member.

The seals had to be designed to prevent hot fluid from entering the head of the valve and the construction of the valve was complicated further by the need to connect the valve to the atmosphere below the cylinder. As a consequence, the presence of the cylinder not only was a complicating factor in the design and operation of the valve, but also created an encumbrance which was undesirable.

Piloted safety valves were also provided heretofore with internal cylinders. These had the advantage of greater compactness than valves with external cylinders as previously described but had similar drawbacks when it was contemplated to use such valves at high temperatures.

French patent document No. 82 14 491 describes a safety valve whose support element for the valve member has two successive parts of different cross sections guided in two successive tubular parts. The support element is sealingly affixed to one end of a metal bellows whose other end is sealingly affixed to the body of the valve. The command-pressure chamber, i.e. the chamber to which the pilot pressure is supplied, is thus partly delimited by the bellows itself.

From a functional point of view, this valve represents a major advance over the valves previously described which rely on command cylinders. However, it contributes the additional drawback that in the normal functioning condition, namely, the condition under which the valve spends most of its time, i.e. the closed position, the bellows is distended. Thus to permit it to resist the pressure of the installation to be protected, the bellows must be made relatively thick, i.e. of significant wall thickness. This means that the bellows is also relatively stiff and fragile. In addition, the support element of the valve member must be of significant cross section and this contributes a correspondingly large dimensioning of the valve body.

OBJECTS OF THE INVENTION

It is the principal object of the present invention to provide an improved piloted safety valve wherein the last-mentioned drawbacks are obviated.

Yet another object of this invention is to provide a safety valve with the advantages characterizing French Pat. No. 82 14 491 but without the drawbacks associated with the structure there described.

SUMMARY OF THE INVENTION

These objects and others which will become apparent hereinafter are attained, in accordance with the invention in a valve for the purposes described and controlled by a pilot pressure which comprises a valve member juxtaposed with the valve seat and disposed at the end of a shaft mounted slidably in a sleeve rigid with the valve body and acted upon by the pressure (pilot pressure) in a chamber supplied with fluid under pressure from the pilot device According to the invention, the upper end of the sleeve is provided with a peripheral column or flange serving as a site for one end of a metal jacket which is extendable and contractible and which also serves to mount the sleeve in the valve body and to seal the sleeve against the valve body.

The end of the shaft opposite that which is provided with the valve member also has a peripheral collar or flange, advantageously axially juxtaposed with the collar or flange of the sleeve. The opposite end of the variable length metal jacket, which can be a bellows, is sealingly connected to the collar of the shaft so that the external face of the jacket and the face of the shaft turned away from the seat define within the valve, the chamber which is subjected to the pressure of the pilot fluid.

More particularly, the valve of the invention can comprise:

a valve body formed with a first passage connected to a pressurizable space to be protected against a pressure excess, a second communicating with the exterior of the valve body, and means forming an annular generally horizontal valve seat around the first passage;

a guide sleeve axially aligned with the valve seat and spaced therefrom, the guide sleeve having a tubular portion extending toward the seat and a peripheral collar at an upper end of the tubular portion bearing against an annular surface of the valve body and supported thereby;

a cap affixed to the valve body over the guide sleeve and having an annular surface bearing against the collar for clamping the collar between the surfaces;

a shaft guided in the sleeve and formed at an upper end thereof with a peripheral collar overlying the peripheral collar of the guide sleeve, the upper end of the shaft being exposed to a fluid pressure in the cap urging the shaft toward the seat with a pilot pressure for holding the valve closed and which, upon reduction, permits opening of the valve by pressure in the space;

a valve member on a lower end of the shaft positioned to engage upon the seat for closing the valve upon application of the pilot pressure in the cap; and a variable-length metal jacket having an upper end sealingly connected to the peripheral collar of the shaft, and a lower end sealingly connected to the peripheral collar of the guide sleeve and contracted in a closed position of the valve, an outer surface of the jacket, the cap and the upper end of the shaft delimiting a chamber receiving the pilot pressure.

Under normal conditions, the force applied by the pilot fluid or command fluid to the shaft, added to the force developed by the spring acting upon the shaft in the valve closing direction, is greater than the force applied to the valve member in the space to be protected.

The movable parts of the valve are then in their closed position. In this position, the metal jacket is in its minimum-length state, i.e. in the case of a bellows, in the compressed state. In this position, the bellows is most resistant to pressure.

Consequently, the jacket can have both reduced thickness and reduced stiffness, permitting use of the device for an extremely large number of opening and closing cycles with low maintenance cost and a low-cost price since the fatigue of the jacket is minimized. Since the thickness of the jacket can be relatively small, it is possible to locate the jacket outside of the valve body proper in a zone where the temperature is low or where fluctuations due to the volume of fluid contained in the space to be protected are nonexistent.

According to a feature of the invention, the face of the valve body at which the bore receiving the sleeve opens, comprises adjacent to this bore, a rib, ridge or shoulder forming a recess serving to enclose, with interposition of an annular seal, the collar of the sleeve which may be provided on the face of this collar opposite that against which a shoulder of a cap for the valve is pressed against this collar to clamp the sleeve in place.

The mounting of the valve is thus relatively simple and if need arises, simply by removal of the cap, it is possible to rapidly replace the assembly consisting of the sleeve, the shaft and the bellows.

Advantageously the valve member of disk is shaped and dimensioned to be able, in the open position of the valve, to sealingly close the end of the sleeve opposite that which is provided with the collar and which is also spacedly juxtaposed with the seat.

As a consequence, the active or sliding parts of the valve are completely isolated from the flow path of the fluid in the open position of the valve, thereby eliminating any risk of deterioration by cavitation or erosion resulting from the turbulent flow of the pressure-relieved fluid.

According to another feature of the invention, the valve seat comprises an annular part which is fixedly mounted in the valve and thus has a definite position vis-à-vis the valve body.

This annular piece is formed in an internal thread in which a calibration piece is threaded so as to be movable by a screwing action to adjust the position of the calibration piece with respect to the valve member.

It is thus possible by a simple screw replacement of the calibration piece to adjust the nominal flow of the valve to any requisite condition, thereby eliminating the need for specially machining the valve seat or the need to stock a large number of costly valve seats for various purposes.

Advantageously, the valve is an elastic metal seal mounted on the fixed part of the seat for ensuring sealing even for fluids with low viscosity.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
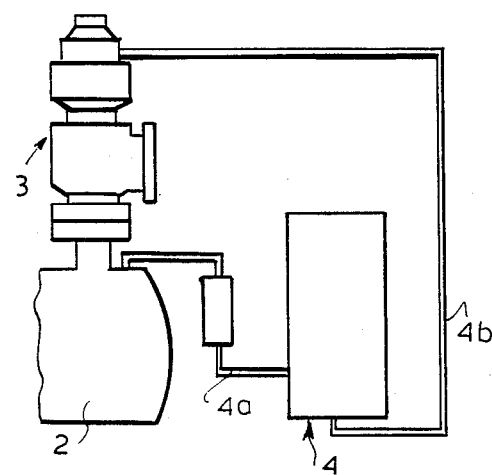
FIG. 1 is an elevational view showing the principles of operation of a safety valve as directed to a prior art construction.
Figure 2:
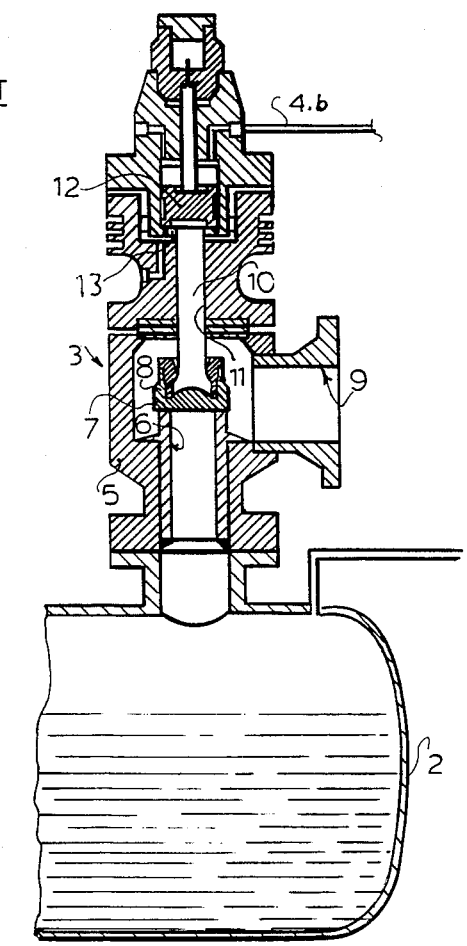
FIG. 2 is a diagrammatic cross-sectional view through the prior art valve of FIG. 1.

In FIGS. 1 and 2, I have shown the prior art valve construction (see U.S. Pat. Nos. 4,291,721 or 4,200,116, for example) to illustrate the principles of the present invention.

As can be seen in FIG. 1, space 2 to be protected, for example a boiler, is surmounted by the piloted safety valve which has been generally indicated at 3 and is controlled by a pilot device 4. The pilot device 4 has a line 4a connected to the space 2 to be protected as a sensor of the pressure within this space and a line 4b supplying a pilot fluid under pressure to the head of the valve 3.

The valve 3 (FIG. 2) comprises a valve body 5 flanged to the boiler 2 and formed with a passage 6 whose upper end forms a seat 7 cooperating with a valve member 8.

The body 5 is also provided with an orifice 9 opening to the atmosphere venting the boiler 2 when the valve member 8 is opened.

The valve member 8 is mounted at an end of a rod 10 slidable in a bore 11 of the valve body. The opposite end of the rod 10 is fixed to a command piston 12 mounted in a cylinder 13 fed with fluid via the line 4b from the pilot device. The drawbacks of this arrangement have previously been described.

Figure 3:
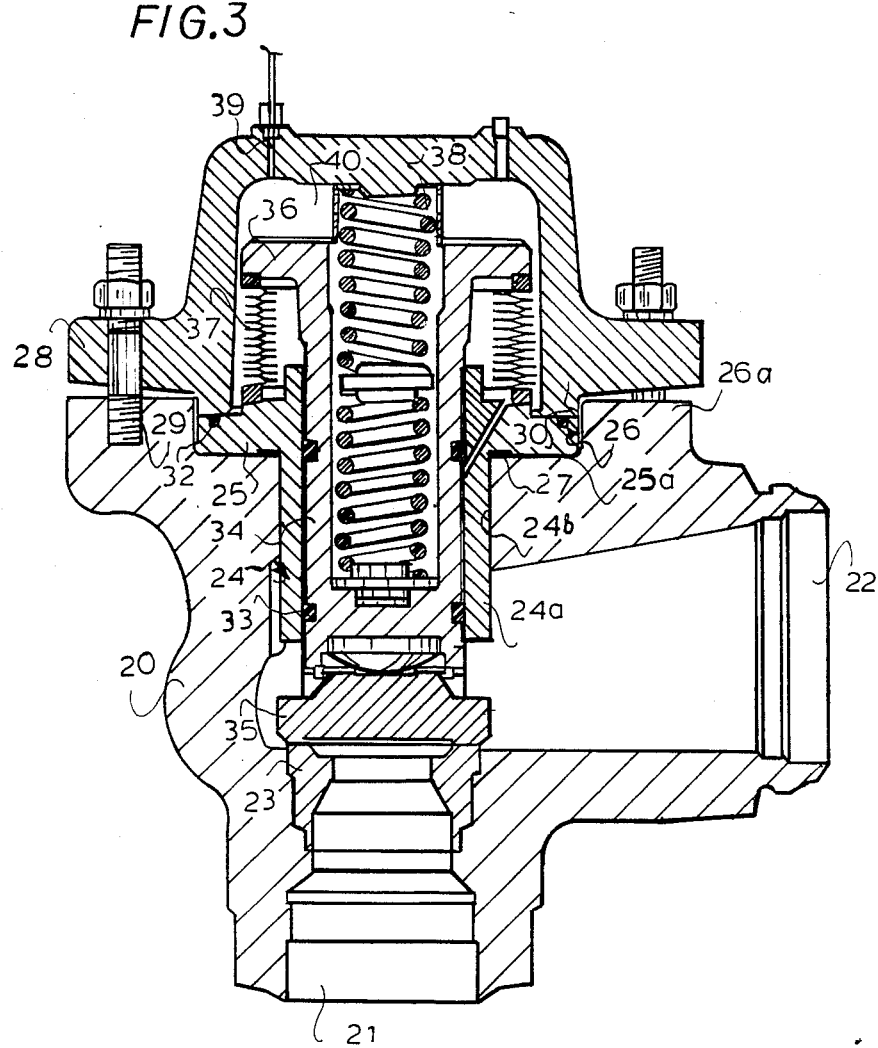
FIG. 3 is a cross sectional view through the valve of the invention in a closed position.
Figure 4:
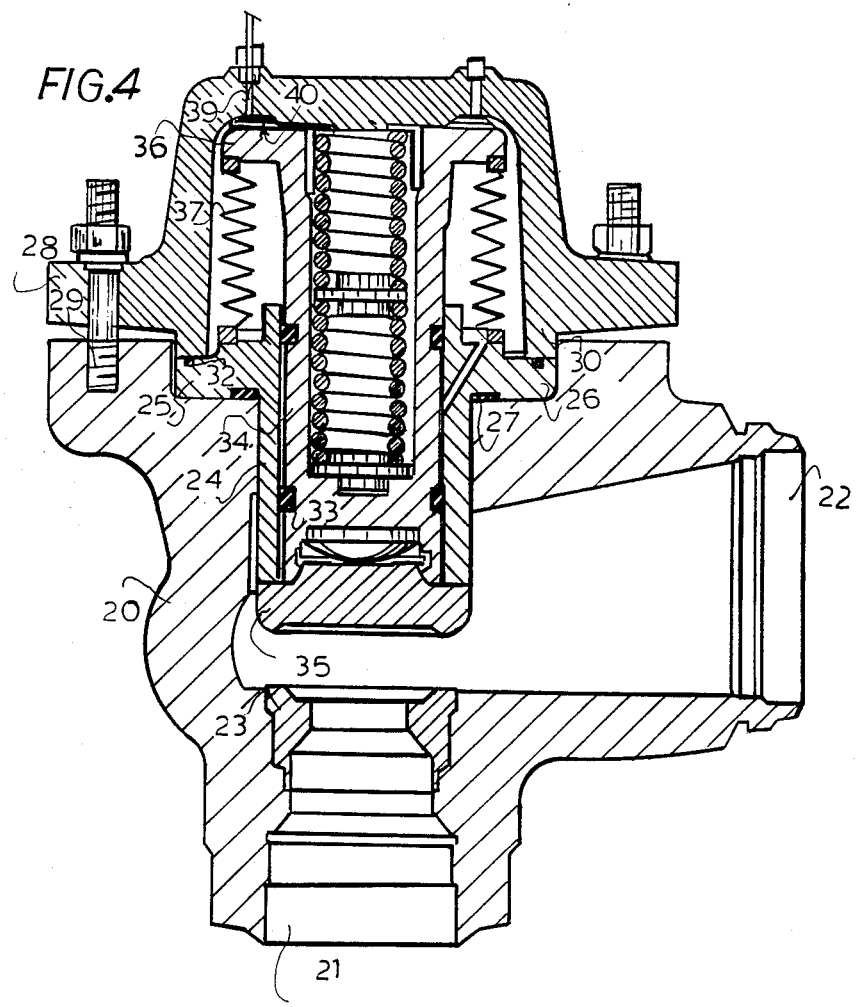
FIG. 4 is a cross sectional view of the valve of FIG. 3 in an open position.

By contrast with the construction shown in FIGS. 1 and 2, the valve of the invention is best seen in FIGS. 3 and 4 representing the closed and open positions of the valve, respectively.

The valve comprises a valve body having a first orifice 21 communicating with the space to be protected and a second orifice 22 constituting the discharge orifice and open to the atmosphere. The orifices 21 and 22 are disposed on opposite sides of the seat of the valve which has been indicated generally at 23.

Coaxial with the orifice 21 and the seat 23, there is mounted within the body, a guide sleeve 24 having a tubular portion 24a and a collar 25.

The peripheral collar 25 or flange is formed on the end of the tubular portion 25a opposite that which is turned toward the seat and is located within the recess 26 defined by a ridge or wall 26a surrounding this recess at the face valve body in which the bore 26b receiving the guide sleeve 24 opens. A seal 27 is provided between the face 25a of the collar 25 and the valve body, immediately surrounding the tubular portion 24a.

The cap 28 of the valve is affixed by bolts 29 to the valve body and has a shoulder 30 bearing against the collar 25 of sleeve 24 with a seal 32 interposed therebetween.

A shaft 34 is mounted so as to slide within the guide sleeve 24 and friction seals 33 are provided between the relatively sliding surfaces.

One end of the shaft 34 is formed with the valve member 35 adapted to bear sealingly against he seat 23 (FIG. 3) while the other end has a peripheral collar 36 turned away from the seat and juxtaposed with the collar 25 of the guide sleeve 24.

The collars 25 and 36 are affixed sealingly to opposite ends of a variable length metal jacket, here represented as a metal bellows 37. A spring 38 is mounted within the hollow shaft 34 and exerts a force thereon in the valve closing direction.

The cap 28 is also formed with an orifice 39 which admits the pilot fluid to the chamber 40 and allows the pilot fluid to be forced from its chamber. In practice, when the chamber 40 is supplied with the pilot fluid under pressure, it applies a force to the shaft and the bellows which tends to displace the shaft in the direction of the seat. This force added to the force of the spring 38 opposes the force resulting from the pressure contained within the space to be protected and applied to the valve through the orifice 21.

Under normal functioning conditions, the force applied by the pressurized fluid in the protected space is less than the force applied to the shaft 34 by the command or pilot fluid and by the spring so that the valve is in its closed position as shown in FIG. 3.

When the chamber 40 is depressurized, the force applied to the lower face of the valve member is greater than the force generated by the spring 38 and the valve opens to assume the position shown in FIG. 4.

In this position the valve member 35 completely blocks the lower end of the guide sleeve 24 preventing turbulent flow and aggressive fluids traversing the valve from attacking the command elements such as the shaft and the bellows 37. It may also be noted that the bellows 37 is located in a region devoid of the fluid from the protected space and thus is not subject to the effects of temperature flow or corrosive character of the fluid. This has been found to considerably increase the effective life of the valve.

Furthermore, as can be seen particularly from FIGS. 3 and 4, the bellows 37 is in its compressed state when it is subjected to the pressure of the command fluid in the chamber 30. The compressed position, of course, corresponds to the condition in which the bellows is better able to resist pressure. As a consequence the thickness of the bellows can be low, the pulse can be of low stiffness and the cost of the bellows is likewise comparatively low.

Mention may also be made of the modular aspects of the valve which permit orbit dismounting of the assembly consisting of the metallic sleeve, the metallic jacket 37, the shaft 34 and the guide sleeve 24 for replacement during normal maintenance of the apparatus.

Figure 5:
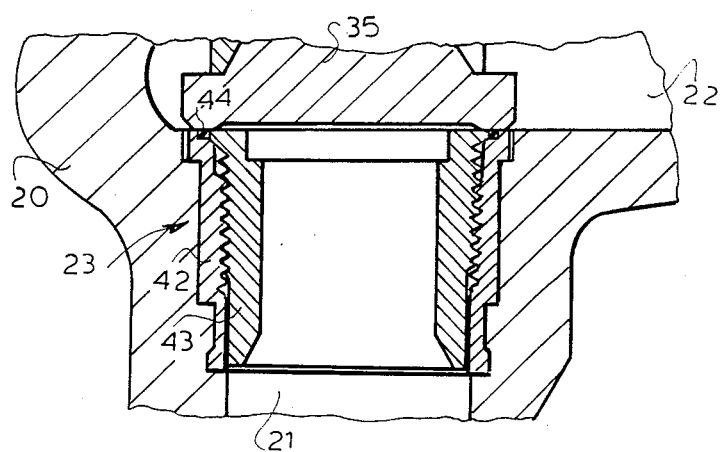
FIG. 5 is a detail section of the valve seat according to the invention in another embodiment.

FIG. 5 shows a detail of the seat 23 in which the latter is composed of two parts, namely an outer part 42 fixedly and definitively mounted in the valve body, e.g. by a press fit.

The inner part 43 is threaded into the outer part 42 and forms a calibration part which, upon screwing, can be adjusted.

It is thus possible to disassociate the sealing function, effected by part 42 via a metal seal 44, and that of flow calibration which utilizes the interior part 43. It is thus possible to adapt a standard valve to a particular nominal flow required by mounting within part 42 an inner part 43 having a flow cross section of desired caliber without the need for machining operations.

As will be apparent from the foregoing, therefore, the invention provides a significant improvement in safety valves, both in terms of simplification and greater reliability.

I claim:

1. A pilot-controlled safety valve, comprising:
   a valve body formed with a first passage connected to a pressurizable space to be protected against a pressure excess, a second communicating with the exterior of said valve body, and means forming an annular generally horizontal valve seat around said first passage;
   a guide sleeve axially aligned with said valve seat and spaced therefrom, said guide sleeve having a tubular portion extending toward said seat and a peripheral collar at an upper end of said tubular portion bearing against an annular surface of said valve body and supported thereby;

a cap affixed to said valve body over said guide sleeve and having an annular surface bearing against said collar for clamping said collar between said surfaces;

a shaft guided in said sleeve and formed at an upper end thereof with a peripheral collar overlying the peripheral collar of said guide sleeve, said upper end of said shaft being exposed to a fluid pressure in said cap urging said shaft toward said seat with a pilot pressure for holding said valve closed and which, upon reduction, permits opening of said valve by pressure in said space;

a valve member on a lower end of said shaft positioned to engage upon said seat for closing the valve upon application of said pilot pressure in said cap; and a variable-length metal jacket having an upper end sealingly connected to said peripheral collar of said shaft, and a lower end sealingly connected to the peripheral collar of said guide sleeve and contracted in a closed position of said valve, an outer surface of said jacket, said cap and said upper end of said shaft delimiting a chamber receiving said pilot ressure.

2. The pilot-controlled safety valve defined in claim 1 wherein said jacket is constituted by a metal bellows.

3. The pilot-controlled safety valve defined in claim 2 wherein said body is formed with a bore receiving said guide sleeve and a rim spacedly surrounding said bore, projecting from said body and receiving said collar of said guide sleeve, said valve further comprising a seal interposed between said guide sleeve and said body within said rim, said cap having a shoulder bearing upon said collar of said guide sleeve on a face thereof opposite said seal.

4. The pilot-controlled safety valve defined in claim 3 wherein said valve member is dimensioned and positioned to engage and completely close an end of said tubular member proximal to said seat in an open position of said valve.

5. The pilot-controlled safety valve defined in claim 4 wherein said seat comprises an internally threaded annular member fixed in said body, and a calibration member threaded into said internally threaded member and adjustable relative thereto by a screwing movement.

6. The pilot-controlled safety valve defined in claim 5, further comprising an elastic metallic seal on said internally threaded member ensuring sealing against said valve member.

7. The pilot-controlled safety valve defined in claim 1 wherein said body is formed with a bore receiving said guide sleeve and a rim spacedly surrounding said bore, projecting from said body and receiving said collar of said guide sleeve, said valve further comprising a seal interposed between said guide sleeve and said body within said rim, said cap having a shoulder bearing upon said collar of said guide sleeve on a face thereof opposite said seal.

8. The pilot-controlled safety valve defined in claim 7 wherein said valve member is dimensioned and positioned to engage and completely close an end of said tubular member proximal to said seat in an open position of said valve.

9. The pilot-controlled safety valve defined in claim 8 wherein said seat comprises an internally threaded annular member fixed in said body, and a calibration member threaded into said internally threaded member and adjustable relative thereto by a screwing movement.

10. The pilot-controlled safety valve defined in claim 9, further comprising an elastic metallic seal on said internally threaded member ensuring sealing against said valve member.

11. The pilot-controlled safety valve defined in claim 1 wherein said valve member is dimensioned and positioned to engage and completely close an end of said tubular member proximal to said seat in an open position of said valve.

12. The pilot-controlled safety valve defined in claim 11 wherein said seat comprises an internally threaded annular member fixed in said body, and a calibration member threaded into said internally threaded member and adjustable relative thereto by a screwing movement.

13. The pilot-controlled safety valve defined in claim 12, further comprising an elastic metallic seal on said internally threaded member ensuring sealing against said valve member.

14. The pilot-controlled safety valve defined in claim 1 wherein said seat comprises an internally threaded annular member fixed in said body, and a calibration member threaded into said internally threaded member and adjustable relative thereto by a screwing movement.

15. The pilot-controlled safety valve defined in claim 14, further comprising an elastic metallic seal on said internally threaded member ensuring sealing against said valve member.

* * * * *